United States Patent [19]
Niimi et al.

[11] Patent Number: 5,191,987
[45] Date of Patent: Mar. 9, 1993

[54] BOTTLE MADE OF SATURATED POLYESTERS

[75] Inventors: Hiroji Niimi; Yoshimitsu Moritani, both of Kuga, Japan

[73] Assignee: Mitsui Petrochemical Industries, Ltd., Tokyo, Japan

[21] Appl. No.: 779,851

[22] Filed: Oct. 21, 1991

[30] Foreign Application Priority Data

Oct. 19, 1990 [JP] Japan .................. 2-282515

[51] Int. Cl.[5] .............. B65D 1/02; B65D 1/42
[52] U.S. Cl. ................ 215/1 C; 220/604; 428/36.92; 428/910
[58] Field of Search ........ 215/1 C; 428/36.92, 428/542.8, 910; 220/604

[56] References Cited

U.S. PATENT DOCUMENTS

| | | | |
|---|---|---|---|
| 3,849,530 | 11/1974 | Wyeth et al. | 215/1 C X |
| 4,164,298 | 8/1979 | Nishikawa et al. | 215/1 C |
| 4,233,022 | 11/1980 | Brady et al. | 215/1 C X |
| 4,358,492 | 11/1982 | Perkins et al. | 215/1 C X |
| 4,385,089 | 5/1983 | Bonnebat et al. | 215/1 C X |
| 4,467,929 | 8/1984 | Jakobsen et al. | 215/1 C |
| 4,589,559 | 5/1986 | Hayashi et al. | 215/1 C |
| 4,615,928 | 10/1986 | Kawaguchi et al. | 215/1 C X |
| 4,618,515 | 10/1986 | Collette et al. | 215/1 C X |
| 4,755,404 | 7/1988 | Collette | 215/1 C X |
| 5,067,622 | 11/1991 | Garver et al. | 215/1 C |

FOREIGN PATENT DOCUMENTS

| | | |
|---|---|---|
| 0280742 | 9/1988 | European Pat. Off. |
| 2073847 | 10/1971 | France . |
| 53-2171 | 1/1978 | Japan ........... 215/1 C |
| 53-44267 | 4/1978 | Japan ........... 215/1 C |
| 62-208345 | 9/1987 | Japan ........... 215/1 C |
| 2-98536 | 4/1990 | Japan ........... 215/1 C |
| 2042408 | 9/1980 | United Kingdom . |
| 2076731 | 12/1981 | United Kingdom . |
| 2218395 | 11/1989 | United Kingdom ....... 215/1 C |

OTHER PUBLICATIONS

Toyo Seikan Kaisha, "Heat-Resistant Polyester Coated Container", Jul. 20, 1989, JPA-1 182,253.

Primary Examiner—Sue A. Weaver
Attorney, Agent, or Firm—Sherman and Shalloway

[57] ABSTRACT

The present invention relates to a bottle made of a saturated polyester comprising a mouth, an upper shoulder, a barrel, a lower shoulder and a bottom, characterized in that the saturated polyester at the upper and/or lower shoulders has an orientation degree of not more than 0.6, the saturated polyester at the upper and lower shoulders has an orientated crystallinity of not more than 50%, and the thickness of the upper and lower shoulders is not less than 0.25 mm.

4 Claims, 3 Drawing Sheets

BOTTLE MADE OF SATURATED POLYESTERS

FIELD OF THE INVENTION

The present invention relates to bottles made of saturated polyesters and more particularly to bottles made of saturated polyesters excellent in resistance to breakage.

BACKGROUND OF THE INVENTION

Glass has been widely used as a material for conventional containers of seasonings, oils, juices, carbonated drinks, beer, Japanese sake, cosmetics, detergents etc. Since the production cost of glass containers is high, empty containers already used have usually been collected and reused repeatedly. Furthermore, the glass containers have disadvantages such as their fragility and inconvenience of handling in addition to a high cost of transportation due to their heaviness.

Because of these drawbacks, glass containers have recently been replaced rapidly by plastic containers. Various kinds of plastics are employed as the container materials according to the sort of contents to be filled and the purpose of usage. Among these plastic materials, saturated polyester resins such as polyethylene terephthalates, being excellent in mechanical strength, heat resistance, transparency and gas barrier properties, are adopted as the materials of the containers for juices, cooling drinks, carbonated drinks, seasonings, detergents, cosmetics and the like.

Recently, the thickness of the bottles made of saturated polyesters such as polyethylene terephthalates tends to be thinner to lower the material cost of bottles. However, an excessive decrease in the thickness of bottles lowers the mechanical strength and sometimes causes breakage of the bottles filled with carbonated drinks, particularly, in the summer time.

The breakage of bottles may not only hurt the commodity images but also cause accidents. Therefore, it is very important in practical use to prevent the breakage of bottles.

The present inventors have studied earnestly the cause of the breakage of bottles made of saturated polyesters and found that most bottles have broken vertically at their upper shoulder region of 5-20 mm from the lower end of the mouth (the neck ring) and the breakage frequency has increased at the higher temperatures and the higher humidities. They also have found by further study based on the above information that the breakage of the saturated polyester bottles mentioned above is scarcely responsible for the chemical structures of the saturated polyester and the breakage can be prevented almost completely, providing the saturated polyester resin at the upper shoulder region of bottles has specific physical properties, and have finally accomplished the present invention.

OBJECT OF THE INVENTION

The present invention is intended to solve the aforementioned problems associated with prior arts, and an object of the present invention is to provide bottles made of saturated polyesters which are proof against breakage even if the bottles filled with carbonated drinks are stored at high temperatures and higher humidities for a long time.

SUMMARY OF THE INVENTION

The bottle made of saturated polyester according to the present invention which comprises a mouth, an upper shoulder, a barrel, a lower shoulder and a bottom (the bottom means a region 3-50 mm distant from its bottom center), is characterized in that the saturated polyester at the upper and/or lower shoulders has an orientation degree of not more than 0.6, the saturated polyester at the upper and lower shoulders has an orientated crystallinity of not more than 50%, and the thickness of the upper and lower shoulders is not less than 0.25 mm.

The bottles made of saturated polyester according to the present invention are proof against breakage even if the bottles filled with carbonated drinks are stored at high temperatures and humidities for a long time, since the upper and lower shoulders of the bottle are strengthened by the saturated polyester with the specific physical properties and have the specific thickness as mentioned above.

Figure 1:
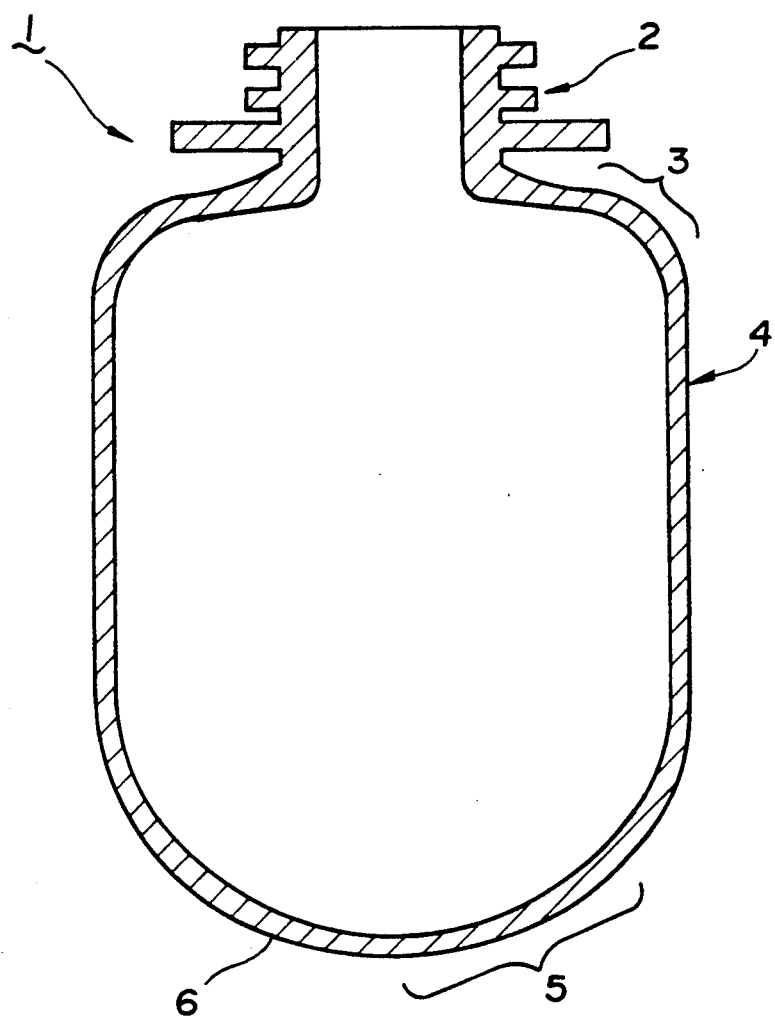
FIG. 1 is a sectional view of the bottle.

1: Bottle
2: Mouth (Neck ring)
3: Upper shoulder
4: Barrel
5: Lower shoulder
6: Bottom

DETAILED DESCRIPTION OF THE INVENTION

The bottles made of saturated polyesters according to the present invention are illustrated hereinafter.

The saturated polyesters used for materials of the bottles according to the invention are described first.

The preferable saturated polyesters used in the invention are polyethylene terephthalates obtained by the reaction of terephthalic acid or its ester-forming derivatives (for example, its lower alkyl esters, its phenyl esters, etc.) with ethyleneglycol or its ester-forming derivatives (for example, its monocarboxylates, ethyleneoxide, etc.)

The polyethylene terephthalates may be copolymerized with less than about 20 mol % of other dicarboxylic acids or glycols. The dicarboxylic acid components are derived from aromatic dicarboxylic acids such as phthalic acid, isophthalic acid, naphthalenedicarboxylic acid, diphenyldicarboxylic acid, diphenoxyethane dicarboxylic acid, etc.; aliphatic dicarboxylic acids such as adipic acid, sebacic acid, azelaic acid, decane dicarboxylic acid, etc.; alicyclic dicarboxylic acid such as cyclohexane dicarboxylic acid, etc.

The glycol components are derived from aliphatic glycols such as trimethylene glycol, propylene glycol, tetramethylene glycol, neopenthyl glycol, hexamethylene glycol, dodecamethylene glycol, etc.; alicyclic glycols such as cyclohexanedimethanol etc.; aromatic diols such as bisphenols, hydroquinone, 2,2-bis(4-β-hydroxyethoxyphenyl)propane, etc.

The polyethylene terephthalates preferably used in the present invention are illustrated hereinafter.

In the preferred polyethylene terephthalates of the invention, the ethylene terephthalate component unit (a) represented by the formula [I],

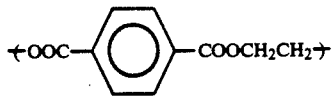

[I]

is contained in the range of 90.0–99.5 mol %, preferably 95–99 mol % and especially 95–98.8 mol %, and the dioxyethylene terephthalate component unit (b) represented by the formula [II],

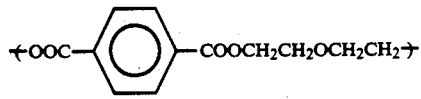

[II]

is contained in the range of 0.5–10.0 mol %, preferably 1–5 mol % and especially 1.2–4 mol %.

The preferable polyethylene terephthalates are substantially linear polyesters in which the aforementioned ethylene terephthalate component unit (a) having the formula [I] and dioxyethylene terephthalate component unit (b) having the formula [II] are randomly arranged by forming ester linkage. That the polyethylene terephthalates are substantially linear may be confirmed by the fact that they are soluble in o-chlorophenol.

The intrinsic viscosities [$\eta$] of the preferable polyethylene terephthalates measured in o-chlorophenol at 25° C. are in the range of 0.50–1.0 dl/g, preferably 0.60–0.95 dl/g and especially 0.62–0.90 dl/g.

Further, the desirable polyethylene terephthalates have heat-up crystallization temperatures ($Tcc_1$), measured with a differential scanning calorimeter (DSC) at a temperature elevating rate of 10° C./min, of not less than 130° C., preferably 135°–185° C. and especially 140°–180° C.

The heat-up crystallization temperatures ($Tcc_1$) of the saturated polyesters used in the present invention are measured according to the following method.

About 10 mmg of a sliced sample taken out of the center part of the saturated polyester chip dried at about 140° C. for more than 5 hours under the reduced pressure of about 5 mmHg is enclosed in an aluminum pan for liquid sample under a nitrogen atmosphere and measured with a Perkin-Elmer DSC-2 Model differential scanning calorimeter. The measurement is carried out as follows; the temperature of the sample is elevated rapidly from room temperature to 290° C. where the sample is kept in a molten state for 10 minutes, followed by rapid cooling to room temperature, then the top temperature of the exothermic peak appearing on elevating the temperature at a rate of 10° C./min is measured.

The saturated-polyester bottles of the present invention comprise, as shown in FIG. 1, a mouth 2, an upper shoulder 3, a barrel 4, a lower shoulder 5 and a bottom 6. In the composition of the bottle 1, the change in the stretch ratio is the largest at the upper shoulder 3, and the second largest at the lower shoulder 5. The orientation degrees of the saturated polyesters at the upper shoulder 3 and the lower shoulder 5 are not more than 0.6, preferably not more than 0.56 and more preferably about 0.50–0.01. The orientated crystallinities of the saturated polyesters at the upper shoulder 3 and the lower shoulder 5 are not more than 50%, preferably not more than 45% and more preferably about 40–10%. Moreover, the thickness at the upper shoulder 3 and the lower shoulder 5 is not less than 0.25 mm, preferably not less than 0.30 mm and more preferably 0.31–3.0 mm.

The saturated-polyester bottles 1, particularly those having, at the upper shoulder 3, the orientation degrees of not more than 0.6, the orientated crystallinities of not more than 50%, and the thickness of not less than 0.25 mm, are proof against breakage even if the bottles are filled with carbonated drinks and stored at high temperatures and humidities for a long time.

The orientation degrees (fb) and the orientated crystallinities of the saturated-polyester bottles are measured respectively in the following manner.

Orientation Degree (fb)

As the saturated polyester molecules are considered to be orientated uniplanar-axially, X-ray interference patterns are measured by an X-ray diffraction method utilizing the (010) diffraction plane.

When the molecules are orientated uniplanar-axially, the orientation degree (fb) is represented by $$fb = 2\langle \cos^2\phi \rangle - 1.$$

Using the equation, the orientation degree is obtained.

Orientated Crystallinity

The X-ray diffraction patterns are obtained by an X-ray diffraction transmission method for a sample fragment prepared by cutting the bottles along the longitudinal direction.

At that time, the sample is longitudinally fixed toward the meridian direction of X-ray optics and the diffraction patterns are measured along the equator direction.

Based on the diffraction patterns, from which crystal and amorphous scattering intensities are evaluated, the orientated crystallinity is obtained from the equation, $$\frac{Ic}{Ia + Ic} \times 100(\%)$$

where Ic and Ia represent the integrated scattering intensities for crystal and amorphous parts respectively.

The saturated-polyester bottles of the present invention are prepared using the aforementioned saturated polyester, for example, in the following manners.

At first, bottle-forming preforms are prepared using the saturated polyester mentioned above. The preforms can be prepared from the saturated polyesters by conventional known methods.

When the bottles are prepared from the above-mentioned bottle-forming preforms by the blow molding method, the followings are preferable.

(a) The stretch ratios along the longitudinal direction are 1.1–3.5 times, preferably 1.2–3.3 times and more preferably 1.3–3.0 times. The stretch ratios along the horizontal direction is usually 1.1–7 times, preferably 1.2–6 times and more preferably 1.3–5 times.

Figure 2:
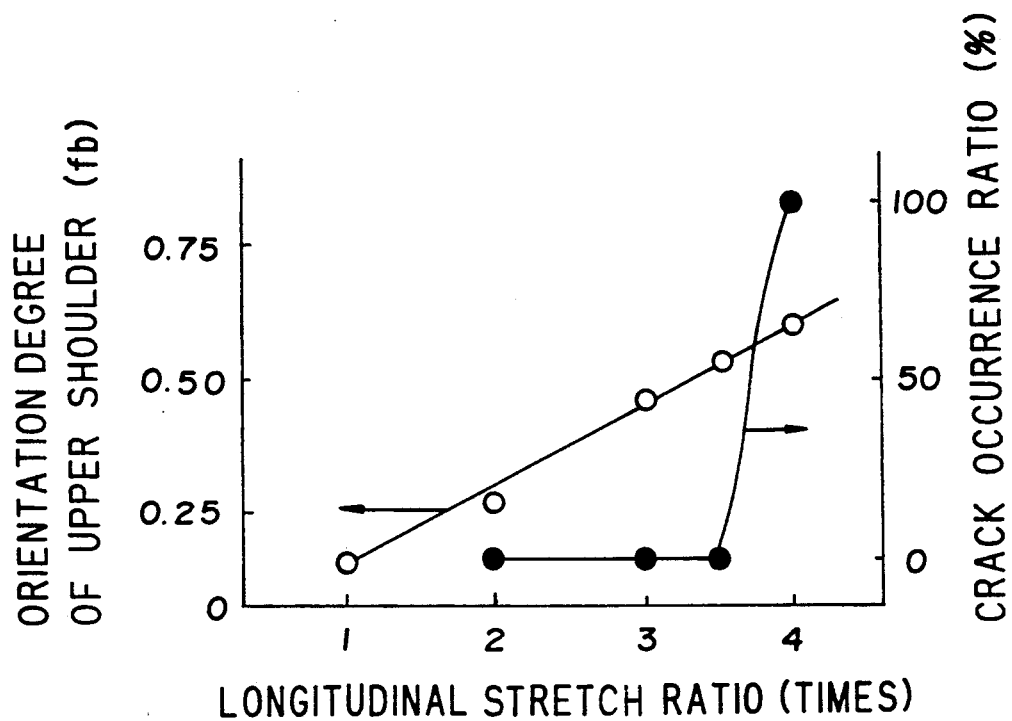
FIG. 2 shows the relation between the stretch ratio of the preform and the crack occurrence ratio.

The occurrence of cracks at the upper and lower shoulders is strongly correlated with the stretch ratio along the longitudinal direction, and the relation between the stretch ratio along the longitudinal direction and the crack occurrence ratio is shown in FIG. 2. It can be seen from FIG. 2 that, if the stretch ratio of the preforms along the longitudinal direction is over 3.5 times, the crack occurrence ratio of the bottles increases sharply.

It is considered that, if the preforms are stretched at over 3.5 times, the thickness of the stretched parts tends to be thinner, whereby the orientation degree of the saturated polyester (fb) becomes over 0.60 and the orientated crystallinity becomes over 50% and consequently the mechanical strength of the resulting bottle is lowered, leading to such sharp increase in the crack occurrence ratio. The relation between the stretch ratio and the orientation degree is also shown in FIG. 2.

The stretch ratio of the bottles is measured in the following manner.

$$\text{Stretch ratio along the longitudinal or horizontal direction} = \frac{\text{the length in a prescribed portion of the bottle}}{\text{the length in a prescribed portion of the preform}}$$

wherein the length in prescribed portion of the preform is that of the portion of the preform to be heated and stretched, and the length in a prescribed portion of the bottles is that of a prescribed portion of the bottle after the prescribed portion of said preform is marked and stretched.

The crack occurrence ratio is measured in the following manner.

Twenty bottles are filled with carbonated water of 4.5 gas volume, sealed with aluminum caps and leave to stand in an air oven at 40° C. and a relative humidity of 90% for one month, and then the crack occurrence is searched and the occurrence ratio is calculated by using the following equation.

$$\text{The crack occurrence ratio (\%)} = \frac{\text{Number of bottles having cracks occurred}}{\text{Number of bottles tested}}$$

(b) The stretch temperature is from 80° C. to 110° C., preferably 85°–107° C. and more preferably 88°–102° C.

Figure 3:
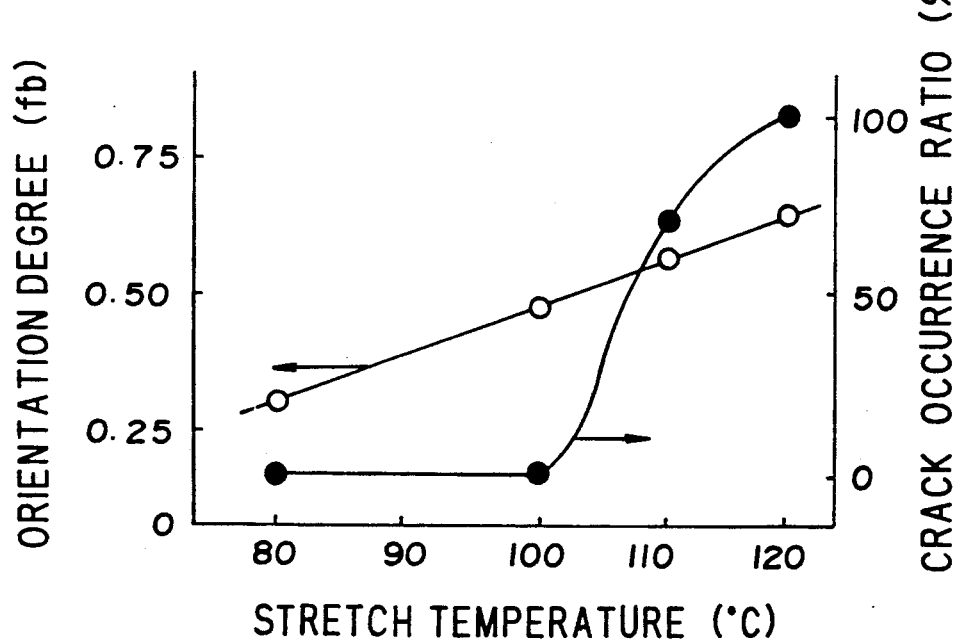
FIG. 3 shows the relation between the stretch temperature of the preform and the crack occurrence ratio and FIG. 4 shows the relation between the blow timing and the crack occurrence ratio.

The relation between the stretch temperature and the crack occurrence ratio of the obtained bottle is shown in FIG. 3. As is clear from FIG. 3, if the stretch temperature of the preforms is over 110° C., the crack occurrence ratio of the bottles increases rapidly.

It is considered that, if the preforms are stretched at over 102° C., the thickness of the stretched parts of the preforms tends to be thinner, whereby the orientation ratio of the saturated polyester (fb) becomes over 0.6, and the orientated crystallinity becomes over 50%, and consequently the mechanical strength of the bottles is lowered, leading to such rapid increase in the crack occurrence ratio. The relation between the stretch temperature and the orientation degree is also shown in FIG. 3.

(c) The blow timing represented by the time interval between the longitudinal stretching and gas blowing of the preforms is 0.1–1.0 sec, preferably 0.1–0.8 sec and more preferably 0.1–0.7 sec.

Figure 4:
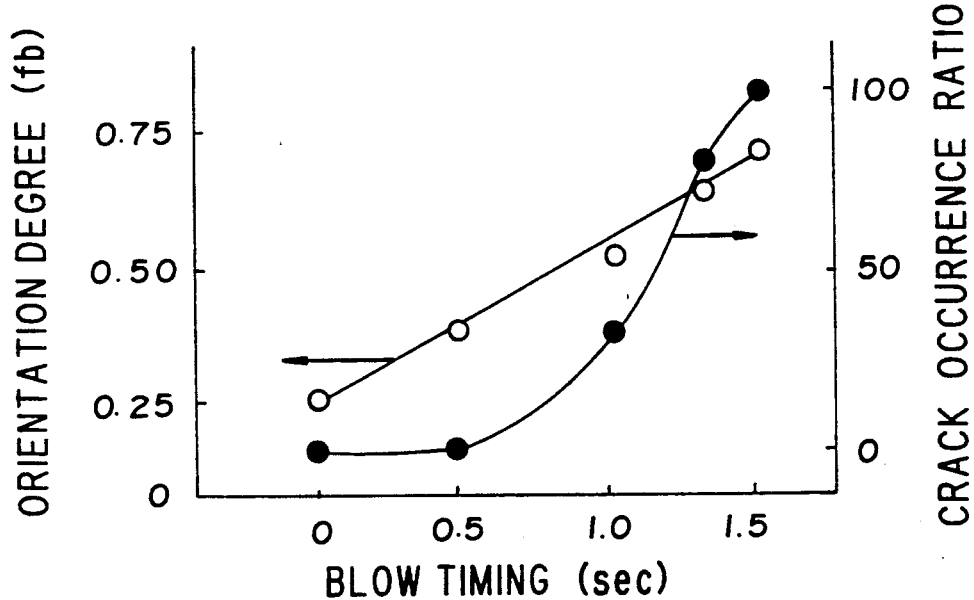

The relation between the blow-timing and the crack occurrence ratio of the obtained bottles is shown in FIG. 4. As is clear from FIG. 4, if the blow timing of the preforms is over 1.0 sec, the crack occurrence ratio of the bottles increases rapidly, and if the blow timing is not more than 0.1 sec, the base center of the bottles is not settled and the bottles having the deviation of the center are obtained.

It is considered that, if the blow timing of the preforms is over 1.0 sec, the thickness of the stretched parts tends to be thinner, thereby the orientation degree of the saturated polyester (fb) becomes over 0.6 and the orientated crystallinity becomes over 50%, and consequently the mechanical strength of the resulting bottle is lowered, leading to such rapid increase in the crack occurrence ratio. The relation between the blow timing and the orientation degree is also shown in FIG. 4.

The invention will now be further described by the following examples, which should not be considered as limiting.

EXAMPLE 1

Polyethylene terephthalate having an intrinsic viscosity [$\eta$] of 0.75 dl/g was dried at 160° C. for 4 hours by a dehumidifying air type dryer D50 manufactured by Kawada Seisakusho Co. The chips were molded at a barrel preset temperature of 280° C. and at a mold temperature of 15° C. by a molding machine M-100A manufactured by Meiki Seisakusho Co., and preforms for biaxial stretch blow moldings were prepared. (Basis weight 50 g)

The preforms were molded at the stretch ratio along the longitudinal direction of 2.5 times, at the stretch ratio along the horizontal direction of 4.0 times, at the stretch temperature of 95° C., at the blow timing of 0.5 sec, at the air pressure of 25 Kg/cm$^2$ and at the blow mold temperature of 40° C. and cylindrical stretched bottles of 1.5 liter were prepared. The thickness distribution of the bottles at the upper shoulders was good and the orientation degree (fb) is 0.46, the orientated crystallinity was 30% and the crack occurrence ratio was 0%.

EXAMPLES 2 and 3

Under the same conditions as in Example 1 except that the stretch ratios along the longitudinal direction were reduced to 2 and 1.5 times by changing the shape of the preforms without changing their weight, the cylindrical stretched bottles of 1.5 liter were prepared.

The physical properties of the bottles are shown in Table 1, and the crack occurrence ratio was 0%, respectively.

EXAMPLES 4 AND 5

Under the same conditions as in Example 1 except that the stretched temperature or 80° C. or 105° C. was used, cylindrical stretched bottles of 1.5 liter were prepared.

The physical properties of the bottle are shown in Table 1, and the crack occurrence ratios were 0% and 30%, respectively.

EXAMPLE 6

Under the same condition as in Example 1 except that the blow timing was 0.7 sec, cylindrical stretched bottles of 1.5 liter were prepared.

The physical properties of the bottle are shown in Table 1, and the crack occurrence ratio was 0%.

COMPARATIVE EXAMPLE 1

Under the same conditions as in Example 1 except that the stretch ratio along the longitudinal direction of 3.9 times was used, cylindrical stretched bottles of 1.5 liter were prepared.

The physical properties of the bottle are shown in Table 1, and the crack occurrence ratio was extremely large as 100%.

The physical properties of the bottle are shown in Table 1, and the crack occurrence ratio was extremely large as 100%.

TABLE 1

|  | Unit | Ex. 1 | Ex. 2 | Ex. 3 | Ex. 4 | Ex. 5 | Ex. 6 | Compar. Ex. 1 | Compar. Ex. 2 | Compar. Ex. 3 |
|---|---|---|---|---|---|---|---|---|---|---|
| Weight of preform | g | 50 | 50 | 50 | 50 | 50 | 50 | 50 | 50 | 50 |
| Stretch ratio along longitudinal direction | times | 2.5 | 2 | 1.5 | 2.5 | 2.5 | 2.5 | 3.9 | 2.5 | 2.5 |
| Stretch ratio along horizontal direction | times | 4 | 4 | 4 | 4 | 4 | 4 | 4 | 4 | 4 |
| Stretch temperature | °C. | 95 | 95 | 95 | 80 | 105 | 95 | 95 | 110 | 95 |
| Blow timing | sec | 0.5 | 0.5 | 0.5 | 0.5 | 0.5 | 0.7 | 0.5 | 0.5 | 1.5 |
| Capacity of bottle | l | 1.5 | 1.5 | 1.5 | 1.5 | 1.5 | 1.5 | 1.5 | 1.5 | 1.5 |
| Orientation degree of bottle (fb) (upper shoulder*) | — | 0.46 | 0.30 | 0.10 | 0.47 | 0.53 | 0.45 | 0.62 | 0.60 | 0.63 |
| Orientated crystallinity of bottle (upper shoulder*) | % | 30 | 22 | 11 | 35 | 33 | 33 | 49 | 36 | 41 |
| Crack occurrence ratio of bottle | % | 0 | 0 | 0 | 0 | 30 cracks at upper shoulder | 0 | 100 cracks at upper shoulder | 70 cracks at upper shoulder | 100 cracks at upper shoulder |
| Minimum thickness (upper shoulder*) | mm | 0.40 | 0.45 | 0.50 | 0.70 | 0.29 | 0.34 | 0.31 | 0.24 | 0.20 |

*Upper shoulder represents a region 5–20 mm distance from the lower end of the neck ring in the height direction.

COMPARATIVE EXAMPLE 2

Under the same conditions as in Example 1 except that the stretch temperature of 110° C. was used, cylindrical stretched bottles of 1.5 liter were prepared.

The physical properties of the bottle are shown in Table 1, and the crack occurrence ratio was very large as 70%.

COMPARATIVE EXAMPLE 3

Under the same conditions as Example 1 except that the blow timing of 1.5 sec was used, cylindrical stretched bottles of 1.5 liter were prepared.

What is claimed is:

1. A bottle made of saturated polyesters comprising a mouth, an upper shoulder, a barrel, a lower shoulder and a bottom, characterized in that the saturated polyester at the upper and/or lower shoulders has an orientation degree of not more than 0.6, the saturated polyester at the upper and lower shoulders has an orientated crystallinity of not more than 50%, and the thickness of the upper and lower shoulders is not less than 0.25 mm.

2. The bottle according to claim 1 wherein the saturated polyester at the upper and/or lower shoulders has the orientation degree of 0.01~0.50.

3. The bottle according to claim 1 wherein the saturated polyester at the upper and lower shoulders has the orientated crystallinity of 10~40%.

4. The bottle according to claim 1 wherein the thickness of the upper and lower shoulders is 0.31~3.0 mm.

* * * * *